United States Patent Office 3,431,578
Patented Mar. 11, 1969

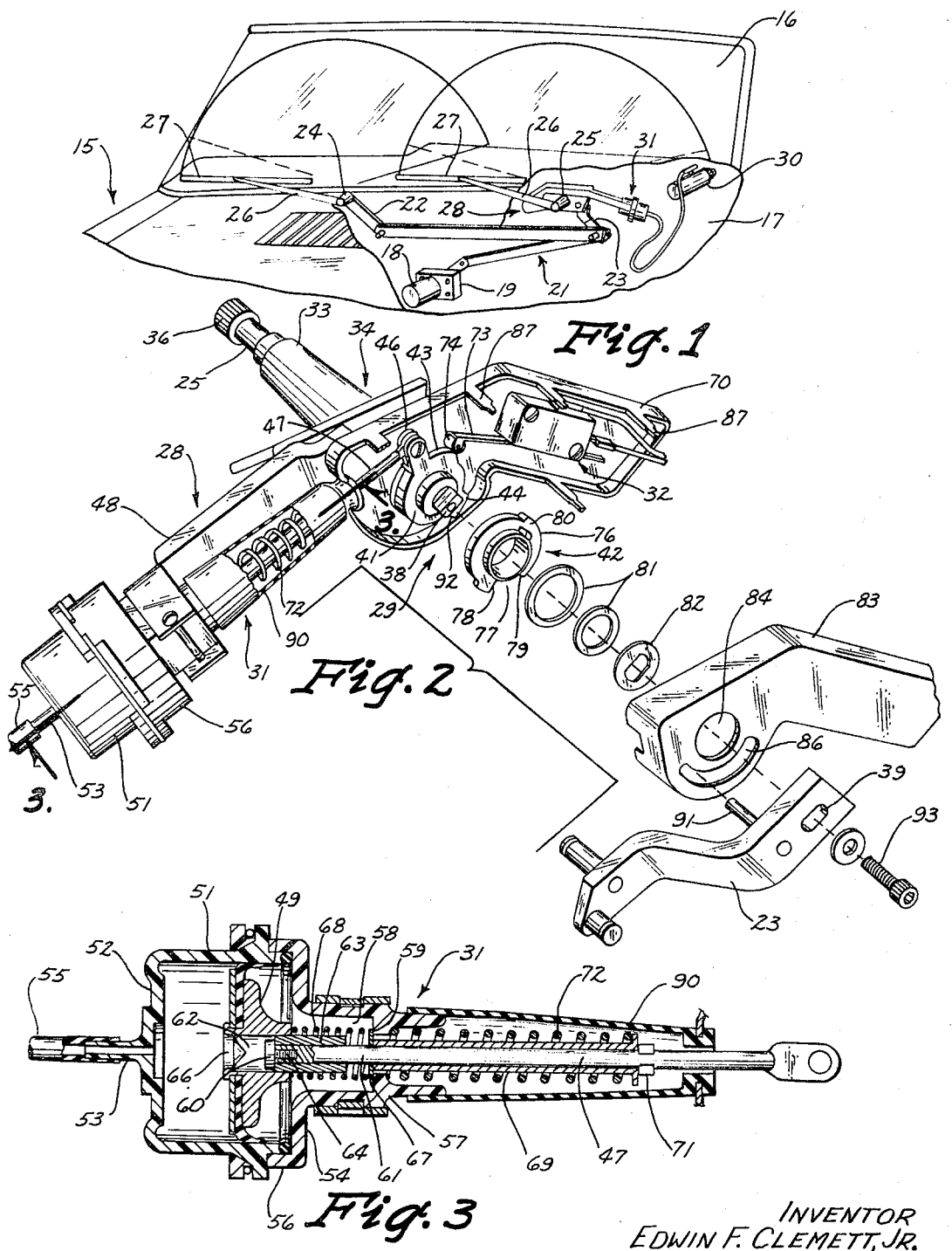

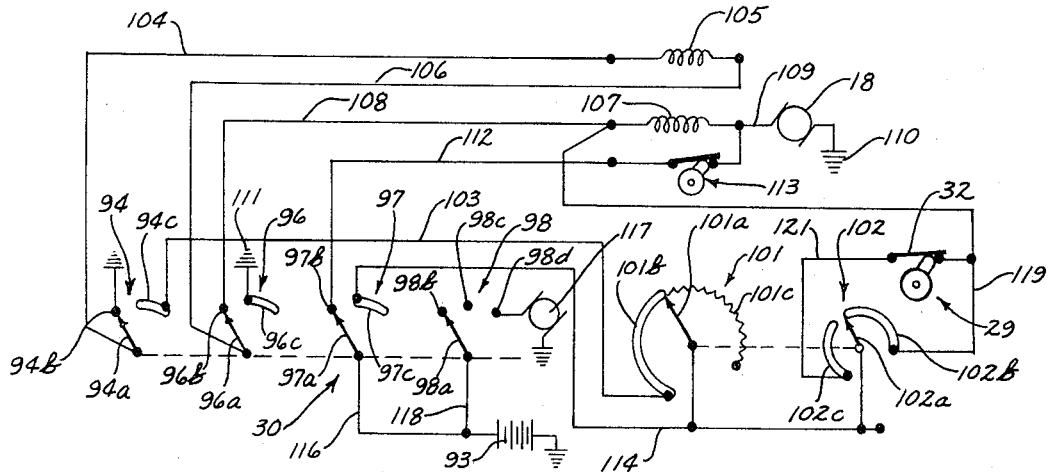

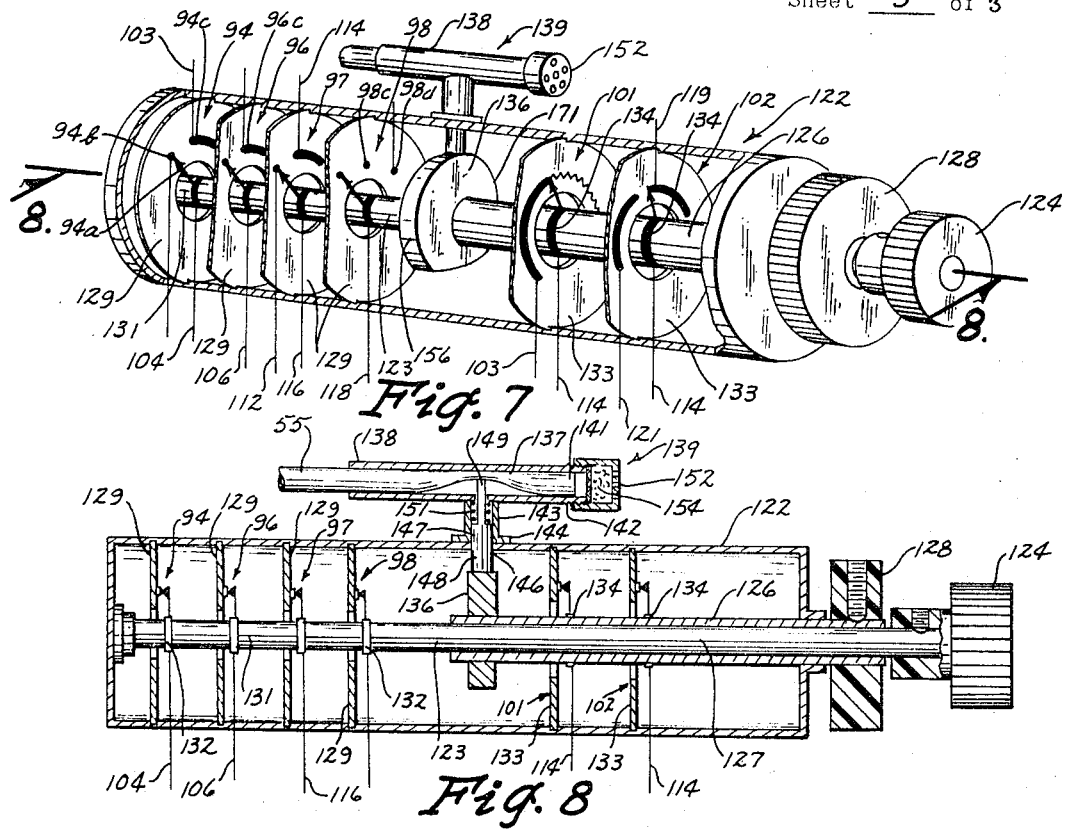

3,431,578
WINDSHIELD WIPER SYSTEM FOR AUTOMOTIVE VEHICLES
Edwin F. Clemett, Jr., Detroit, Mich., assignor, by mesne assignments, to McCord Corporation, Detroit, Mich., a corporation of Maine
Filed Feb. 15, 1967, Ser. No. 616,220
U.S. Cl. 15—250.12                    7 Claims
Int. Cl. B60s 1/06

ABSTRACT OF THE DISCLOSURE

A vehicle windshield clearing system in which the wiper blade may be continuously operated at variable speeds or operated intermittently through a complete wiping cycle with a dwell period of variable duration between wiping cycles, wherein a pneumatic time delay unit and a combination timing and actuating unit for controlling the wiper blade for intermittent operation are carried on the wiper pivot shaft housing in operative association with the wiper pivot shaft and power drive therefor.

Summary of the invention

The wiper system of this invention is adapted to control the wiper blade for intermittent operation during light rain or mist conditions, while otherwise providing for a normal operation of the wiper blade. A single control means conveniently accessible to the vehicle operator is manually actuated to set the wiper system for intermittent or continuous operation, to control the frequency of wiper operation when the system is set for intermittent operation and to vary the speed of wiper operation when the system is set for continuous operation.

Detailed description of the invention

This invention relates generally to vehicle windshield cleaner systems and in particular to a windshield clearing system in which the wiper may be operated continuously at varying speeds or intermittently with variable intermittent dwell periods.

An object of this invention is to provide an improved windshield clearing system.

A further object of this invention is to provide a windshield clearing system in which the wiper may be operated continuously at variable speeds or intermittently with the dwell period between wiper operations adjustable in duration to accommodate variable rates of moisture accumulation on the windshield.

Still another object of this invention is to provide a windshield clearing system for wiping a windshield with intermittent dwell periods wherein the time duration of the dwell period and the cycle of wiper operation are automatically controlled by a combination timing and actuating means carried on the wiper pivot shaft and arranged within the pivot shaft housing.

A further object of this invention is to provide a windshield clearing system for continuous or intermittent wiper operation in which the system can be readily changed from intermittent to continuous wiper operation to provide for an immediate removal from the windshield of sudden heavy precipitation deposits.

Further objects, features and advantages of this invention will become apparent from the following description when taken in connection with the accompanying drawings in which:

FIG. 1 is a fragmentary perspective view of the front portion of a vehicle showing a wiper and wiper motor system with the intermittent wiper control assembly of this invention;

FIG. 2 is an exploded perspective view of the intermittent wiper control assembly shown generally in FIG. 1;

FIG. 3 is an enlarged longitudinal sectional view taken along line 3—3 in FIG. 2 showing a pneumatic time delay unit which forms part of the intermittent wiper control assembly;

FIG. 4 shows an electrical circuit for the wiper control system when the wiper is in a park position;

FIG. 5 shows the electrical circuit of FIG. 4 set for a continuous wiper operation;

FIG. 6 shows the circuit of FIG. 4 set for an intermittent wiper operation;

FIG. 7 is a perspective view of a switch assembly for controlling the wiper for continuous or intermittent operation, with some parts broken away and other parts shown in section to more clearly illustrate its construction;

FIG. 8 is a sectional view as seen on line 8—8 in FIG. 7;

FIG. 9 is an elevational view of a cam timing unit which forms part of the intermittent wiper control assembly showing the arrangement of the cam members with a wiper motor control switch and the time delay means of FIG. 3, when the wiper is in a park or rest position;

FIGS. 10, 11 and 12 are illustrated similarly to FIG. 9 and show, respectively, the moved position of the cam members relative to the wiper motor control switch and time delay means when the wiper is in normal continuous operation (FIG. 10); when intermittent wiper operation is initiated (FIG. 11); and when the wiper is in intermittent operation (FIG. 12);

With reference to the drawings there is shown in FIG. 1 the front portion of a vehicle 15 having a windshield 16 mounted thereon in a conventional manner. Suitably secured to the vehicle fire wall 17 is a wiper motor 18 having a gear assembly 19 operatively associated with a power transmission linkage means, indicated generally at 21, and including pivoted crank arms 22 and 23 the outer ends of which are pivotally mounted on corresponding rock or pivot shafts 24 and 25 which also have rigidly mounted thereon wiper arms 26 for carrying wipers 27. As is well understood on rocking of the pivot shafts 24 and 25, in response to an operation of the motor 18, the wipers 27 are oscillated to clear moisture from the windshield 16.

The intermittent wiper control assembly of this invention generally indicated at 28 in FIGS. 1 and 2, includes a cam timing and actuating unit 29, a pneumatic time delay unit 31, a wiper motor control switch 32 and the pivot shaft 25.

The pivot shaft 25 is rotatably supported for rocking movement in a forwardly extended bearing member 33 (FIG. 2) forming part of a usual pivot housing 34, with the front end 36 of the pivot shaft 25 being fluted to receive in a fixed relation a wiper arm 26. The rear section of the shaft 25, projects outwardly and rearwardly from the housing 34 and is formed at its terminal end 38 with a male fitting of a rectangular shape in transverse cross section to receive in mating relation a socket 39 formed at the outer end of the crank arm 23.

The cam and timing unit 29 includes a pair of cam members 41 and 42 rotatably supported in a side-by-side relation on the rear section of the pivot shaft 25, with the cam member 41 arranged forwardly of the cam member 42. For the purpose of convenience the cam member 41 will be referred to as a dwell control cam and the cam member 42 as a wiper control cam.

The dwell control cam 41 (FIG. 2) is formed with a pair of circumferentially spaced high sections 43 and 44 to be referred to as a switch control section and time delay actuator section, respectively. Projected radially from the dwell control cam 41 at a position adjacent one end of the switch control section 43 is a pair of axially spaced ears 46 for receiving therebetween in a pivoted connection the terminal or free end of a working member or piston rod 47 that forms part of the pneumatic time delay unit 31.

The time delay unit 31 is carried on a bracket 48 that is suitably secured to the pivot housing 34 with the piston rod 47 arranged substantially normal to the radially projected ears 46 and extended therefrom in a direction away from the wiper control switch 32. The inner end of the piston rod 47 (FIG. 3) carries a piston 49 operatively associated with a cylinder 51 of a cup shape, the end wall 52 of which is formed with an air connection 53 adapted for connection with an air bleed tube 55. A tubular housing 54 has one end section 56 that receives in interlocking engagement the open end of the cylinder 51 and an opposite reduced end section 57 that has a bore 58 formed with an intermediate inwardly extended annular shoulder 59.

The piston rod or working member 47 extends axially of the housing section 54 with its end section 61 projected into the housing section 56. The piston 49 is formed with an axial bore 62 within the outer end of which is rigidly secured one end of a sleeve member 63 of a size to rotatably receive therein the end section 61 of the piston rod 47. A screw 64 receivable in the piston bore 62 and threadable within the terminal face of the piston rod end section 61 has a head 60 engageable with the sleeve member 63 to hold the sleeve member against axial movement off of the piston rod end section 61. The inner end of the piston bore 62 is closed by a cap member 66.

A collar 67 fixed on the piston rod 47 adjacent to the sleeve member 63 is engageable with the shoulder 59 in the reduced end section 57 of the tubular housing 54. Mounted about the sleeve member 63 is a coil spring 68 which is held in compression between the outer end of the piston 49 and the stop collar 67.

An elongated sleeve member 69 is positioned about the piston rod 47 between the stop collar 67 and a stop member 71 fixed on the rod 47 at a position spaced inwardly from the outer end of the piston rod. A coil spring 72 mounted about the elongated sleeve member 69 is held in compression between the shoulder 59 and the outer end of the elongated sleeve member 69.

It is seen, therefore, that the piston 49 is movable inwardly of the cylinder 51 against the pressure of the spring 72 and is moved outwardly of the cylinder by the extending action of the spring 72. The outward movement of the piston 49 is limited by the engagement of the stop collar 67 with the stop shoulder 59. The coil spring 68 acts to hold the sleeve member 63 against the head 60 of the screw 64 but permits movement of the piston rod 47 axially of the piston 49 on engagement of the piston with the cylinder end wall 52 as may occur when air is completely evacuated from the cylinder 51.

The switch unit 32 (FIG. 2) for controlling wiper movement, when the wiper is being intermittently operated, is mounted on a housing section 70 that is attached to the pivot housing 34. The switch 32 is positioned to the side of the dwell period cam 41 opposite the time delay unit 31 and has an actuating finger 73 provided with a roller 74 that is engageable with the switch control section 43 of the cam 41. When the roller 74 is riding on the cam section 43 the switch 32 is in a closed position therefor to provide for the operation of the wiper motor 18. Movement of the switch control section 43 out of engagement with the roller 74 opens the switch 32.

The dwell control cam 41 is operated by the crank arm 23 to move the piston rod 47 inwardly, or to the left as viewed in FIG. 2, to initiate the time delay action of the pneumatic unit 31 to provide for the dwell or non-operating period of the wiper 27 during intermittent wiper operation. The piston rod 47 on outward movement thereof, or to the right as viewed in FIG. 2, in response to the action of the spring 72 rotates the dwell period cam 41 in a clockwise direction, as also viewed in FIG. 2, to a position wherein the switch control section 43 engages the switch roller 74 to initiate wiper operation.

The cam 41 for intermittent wiper operation is thus rotated in a counterclockwise direction, as viewed in FIG. 2 to initiate the dwell period of non-wiper operation and is rotated in an opposite direction by the outward movement of the piston rod 47 to initiate wiper operation at the termination of the dwell period.

The switch or wiper control cam 42 (FIG. 2) coacts with the dwell period cam 41 to take over the holding of the switch 32 in the closed position therefor, as effected by the dwell period cam 41 at the termination of the dwell period, and functions alone to open the switch 32 on completion of a cycle of operation of the wiper 27 following the function of the cam 41 to initiate the time delay action of the pneumatic unit 31.

The dwell period cam 41 thus initiates operation of the pneumatic time delay unit 31 and on termination of such operation initiates the operation of the wipers 27. The switch control cam 42 in turn takes over the control of wiper operation, as initiated by the cam 41, and continues such wiper operation for a complete wiping cycle. During this wiping cycle the pneumatic time delay 31 is set into operation by the dwell period cam 41 in a manner to be later described.

The switch control cam 42 (FIG. 2) is formed with a cam section 76 having a radius of generation equal to the radius of generation of the switch control section 43 on the cam 41 and a circumferential length greater than the circumferential length of the cam section 43. Adjacent one of its ends the cam section 76 has a cut away portion or notch 77, the end walls 78 and 79 of which constitute stops or shoulders.

In the side-by-side assembly of the cams 41 and 42 on the pivot shaft 25 the end portion 80 of the cam section 76 is arranged for engagement with the roller 74 on the switch actuating lever 73. Bearing washers 81 stacked on the shaft 25 against the cam member 42 are held in place by a clip member 82 fitted about the shaft terminal section 38.

A housing section 83, corresponding to the housing section 70, is formed with an opening 84 for the shaft 25 and an arcuate slot 86 concentric with the opening 84. The housing section 83 is positioned in mating relation with the housing section 70 and is secured thereto in a usual manner by clip fingers 87 on the housing section 70 which are bendable about the housing section 83. The cam unit 29 and switch unit 32 are thus completely enclosed within the housing sections 70 and 83 which are relatively formed at one of their corresponding ends to receive the piston rod 47 and a flexible dust guard 90.

The crank arm 23 (FIG. 2) adjacent the socket 39 is provided with a laterally extended pin 91. On fitting of the socket 39 on the shaft end section 38, which projects through the housing opening 84, the pin 91 is inserted through the slot 86 to a position within the notch 77 of the wiper control cam 42 and extended transversely of the cam 41 adjacent the end 92 of the actuator section 44 thereof. The crank arm 23 is secured against movement off of the pivot shaft 25 by a screw assembly 93 that is axially threaded into the shaft end section 38.

On rocking movement of the crank member 23 in a counterclockwise direction, as viewed in FIG. 2, the pin 91 is engageable with the shoulders 79 and 92 on the cams 41 and 42, respectively, to provide for the rotation of the cams in a counterclockwise direction. On rocking movement of the crank member 23 in a clockwise direction only the stop 78 on the cam 42 is engaged to provide for a clockwise rotation of the cam 42 relative to the cam 41. The assembly of the pin 91 with the cam members 41 and 42 thus constitute a lost motion connection of the crank arm 23 with the cams 41 and 42 to provide for their concurrent and relative rotation in response to the rocking or oscillating movement of the crank arm 23.

When the wipers 27 are to be operated intermittently, the circuit of the wiper motor 18 includes the control switch 32 so that the motor is operated only when the control switch is closed by the cooperative action of the cams 41 and 42 in the manner above described. For a normal operation of the wipers 27, the control switch 32 is cut out of the circuit for the motor 18 so that the operation of the motor is controlled entirely from a manual control switch, indicated generally at 30 in FIG. 1.

Thus referring to FIG. 4 the electrical circuit for the motor 18 is illustrated for a parked position of the wipers 27. This circuit includes the motor 18, the motor control switch 32, the manual control switch 30 and the usual vehicle battery 93. The control switch 30 includes a first series of four switches 94, 96, 97 and 98 each of which includes a rotatable switch arm 94a, 96a, 97a and 98a, respectively, that are simultaneously movable to three switch positions, namely, a first or parked position, a second normal or intermittent wipe position and a third or a windshield washer operating position wherein normal or intermittent wiper operation is continued. An intermittent or normal wiper operation, when the switch members 94a, 96a, 97a and 98a are in the second positions therefor, is determined by the setting or actuation of a second series of switches 101 and 102, formed as part of the manual control switch 30 and each of which includes a switch arm 101a and 102a, respectively, that are rotatable together relative to the switch arms 94a, 96a, 97a and 98a.

The switches 94, 96 and 97 have respective first terminals 94b, 96b and 97b and bridge terminals 94c, 96c and 97c. The switch 98 has terminals 98b, 98c and 98d. Switch 101 has a bridge terminal 101b in series connection with a rheostat resistance 101c. Switch 102 includes a pair of separated bridge terminals 102b and 102c.

The terminal 94b of the switch 94 is connected to ground and its bridge terminal 94c is connected by a line 103 to the bridge terminal 101b of the switch 101. The switch arm 94a is connected through a line 104, motor field 105 and line 106 to the switch arm 96a of the switch 96. The terminal 96b is connected to the armature field 107 by a line 108, with this field being connected by a line 109 with the wiper motor 18. The motor 18 is grounded at 110 and the bridge terminal 96c is grounded at 111.

In the switch 97 the terminal 97b is connected by a line 112 to the motor lead line 109 through a usual and well known cam actuated type wiper parking switch 113 that is series connected in the line 112. The bridge terminal 97c is connected by a feed line 114 to the switch arms 101a and 102a of the switches 101 and 102, respectively, and the switch arm 97a is connected to the battery 93 by lead line 116.

The switch 98 is incorporated in the electrical circuit when a windshield washer system is to be used with the wiper system. The terminals 98b and 98c of the switch 98 are open, with the terminal 98d being connected to a motor 117 for operating a fluid pumping (not shown). The switch arm 98a is connected to the battery 93 through line 118.

The bridge terminal 102b of the switch 102 is connected by a line 119 to the line 108 and the terminal 102c is connected to the line 119 by a line 121 in which the actuator control switch 32 is series connected.

With the switches 94, 96 and 97, in their parked positions, shown in FIG. 4, the circuits through these switches will be open at the parking switch 113, after the wipers 27 have been moved to their parked positions. When the switches 94, 96 and 97 are moved from their parking positions in FIG. 4 to their wiper operating positions of FIG. 5, the circuit for the field 105 from the battery 93 is through switch 97 line 114, switch 101 line 103, switch 94, line 104, field 105, line 106 and through switch 96 to ground. The circuit for the field 107 from the battery 93 is through the switch 97, line 114, switch 102, line 119, field 107 and motor 18 to the ground 110.

With the switch arms 101a and 102a of the switches 101 and 102, respectively, maintained in contact engagement with the resistance 101c and the bridge terminal 102b, also respectively, as indicated for their dotted line positions in FIG. 5, the wipers 27 will be continuously operated at a speed dependent upon the position of the switch arm 101a relative to the resistance 101c. When intermittent wiper operation is desired, the switches 94, 96, 97 and 98 are retained in their positions of FIG. 5 and only the switches 101 and 102 are actuated from their positions in FIG. 5 to the positions therefor shown in FIG. 6.

As a result the circuit for the field 105 is the same in FIGS. 5 and 6. However, the circuit for the field 107 in FIG. 6 is closed through the actuator switch 32 by the connection of the feed line 114 with the terminal 102c through the switch arm 102a. Thus, for intermittent wiper operation, the operation of the motor 18 is controlled in direct response to the opening and closing of the switch 32 as effected by the relative rotation of the cams 41 and 42 of the cam unit 29 in the manner hereinabove described.

When washer operation is desired during either the normal wiper operation shown in FIG. 5 or during intermittent wiper operation as shown in FIG. 6, simultaneous movement of the switch members 94a, 96a, 97a and 98a to the third positions therefor, illustrated in dotted lines in both FIGS. 5 and 6, results in the operation of the washer motor 117 without otherwise effecting wiper operation. The washer motor 117 will remain in continuous operation for so long as the switch members 94a, 96a, 97a and 98a are retained in the third or dotted lined positions therefor.

Assuming the wipers 27 to be normally operated, as provided for by the circuit in FIG. 5, and their operation is to be discontinued, the switch members 94a, 96a, 97a and 98a are moved to their park positions shown in FIG. 4. The parking switch 113 is then closed in a usual and well known manner in response to cam actuation by the wiper motor 18. With the parking switch 113 closed the current flow to the fields 105 and 107 is reversed relative to the direction of current flow therethrough for a normal or intermittent operation of the wipers 27. In other words, the circuit through the fields 105 and 107 from the battery 93 is through switch 97 line 112, parking switch 113, line 109, field 107, line 108, switch 96, line 106, field 105 and line 104 to ground at the switch 94. This reversal of current flow through the fields 105 and 107 provides for a reversed operation of the motor 18 which continues until the wipers 27 are moved to their parked position shown in FIG. 1. At this parked position of the wipers 27 the parking switch 113 is opened in response to cam actuation by the motor 18 so as to discontinue any further operation of the motor 18.

With the wipers 27 set for intermittent operation as shown in FIG. 6 movement of the switch members 94a, 96a, 97a and 98a to their park positions shown in FIG. 4 will provide for the parking of the wipers 27 in the same manner as described above relative to the FIG. 5.

It is to be noted that the parking of the wipers 27 from either the normal operation of FIG. 5 or the intermittent operation of FIG. 6 takes place independently of any operation of the switches 101 and 102 which alone control the wipers 27 for normal or intermittent wiper operation. Thus, if the switches 101 and 102 are in their dotted positions of FIG. 5 providing for a normal wiper operation, when the wipers are parked, on movement of the switch members 94a, 96a and 97a from their park positions to the second or wiper operating positions therefor of FIG. 5, the wipers 27 will operate normally. Likewise if the switches 101 and 102, when the wipers 27 are parked, are in their dotted positions shown in FIG. 6 then, on movement of the switch members 94a, 96a, 97a to their second or wiper operating positions, the wipers 27 will operate intermittently.

The manual control switch 30 (FIGS. 7 and 8) is suitably mounted on the instrument panel of the vehicle and includes a housing 122 of a hollow cylindrical shape. A shaft 123 extended axially of and rotatably supported within the housing 122 has a control knob 124 mounted on the end thereof projected outwardly from the instrument panel. A tubular shaft 126 rotatably mounted over a section 127 of the shaft 123 has a projected portion for carrying a control knob 128 at a position adjacent to the control knob 124.

The switches 94, 96, 97 and 98, which are of a wafer type, have terminal carrying plate members 129 loosely mounted about the section 131 of the shaft 123 in an aligned and axially spaced relation. This relation is maintained by suitably attaching the peripheral portions of the plates 129 to the inner peripheral surface of the housing 122. The switch members 94a, 96a, 97a and 98a corresponding to the switches 94, 96, 97 and 98 are secured to electrically insulated ring members 132 that are mounted about and fixed to the shaft 123 for rotation therewith. It is seen therefor that on manipulation of the knob 124 the switch members 94a, 96a, 97a and 98a are rotated together relative to the fixed terminal carrying plates 129.

The switches 101 and 102, which are also of a wafer type, have terminal carrying plates 133 loosely mounted about the tubular shaft 126 in an aligned axially spaced relation with the terminal carrying plates 133 being secured to the housing 122. The corresponding switch arms 101a and 102a are attached to electrically insulated ring members 134 that are secured to the tubular shaft 126 for rotation therewith.

Also fixed on the tubular shaft 126 is a cam 136 for controlling the admission rate of air to the bleed tube 55 for the pneumatic time delay unit 31. The terminal portion 137 of the bleed tube 55 (FIG. 8) is snugly fitted within a tubular cross arm 138 of a T-shaped housing 139 with what will be referred to as its inlet end 141 terminating at the end 142 of the cross arm 138. The free end of the leg 143 of the housing 139 is formed with a laterally extended flange 144 adapted to secure the leg 143 to the switch housing 122 in axial alignment with an opening 146 that is formed in the housing wall at a position in transverse alignment with the cam 136.

A spring pressed pin 147 has a head portion 148 extended through the opening 146 for slideable movement within the leg 143. The shank 149 of the pin is extended through an opening formed in the side wall of the cross arm 138 for engagement of its free end with the bleed tube 55. A spring 151 mounted about the shank 149 is arranged in compression between the head portion 148 and the tubular cross arm 138 so as to maintain the head portion in riding engagement on the outer peripheral surface of the cam 136.

Thus in response to a rotation to the cam 136 the pin 147 is reciprocated transversely of the cross arm 138 to an extended position wherein the sidewalls of the bleed tube 55 are pinched or closed against each other to shut off the supply of air to the tube inlet 141, and to a retracted position providing for the supply of air to the tube inlet 141. A perforated cap 152 for the end 142 of the tubular cross arm 138 forms a chamber for receiving a filtering material 154 for filtering the air supplied to the bleed tube inlet 141.

The action of the cam 136 to regulate the supply of air from and to the pneumatic time delay unit 31 through the bleed tube 55 is controlled relative to the positions of the switch arms 101a and 102a of the switches 101 and 102, respectively. Thus referring to the circuit diagram in FIG. 5, wherein the wipers 27 are controlled for normal operation the switch arm 101a is at the junction of the bridge terminal 101b and rheostat 101c to provide for a slow continuous operation of the wipers, and the switch arm 102a is at one end of the bridge terminal 102b. At these positions of the switch arms 101a and 102a a high side 156 of the cam 136 is engageable with the pin 147 so that the pin is in a fully extended position within the cross arm 138 to close the bleed tube 55.

On manipulation of the knob 128 to move the switch arm 101a across the rheostat 101c, from a slow to a fast speed operation of the wipers 27, the high side 156 of the cam 136 remains engaged with the pin 147 to keep the bleed tube 55 closed. In other words the peripheral length of the cam high side is of an angular extent substantially equal to or slightly greater than the arcuate length or angular extent of the rheostat 101c. Thus over the full range of wiper speeds, during a normal wiper operation, the air bleed tube 55 is shut off whereby the piston rod 47 of the pneumatic time delay unit 31 is held in a retracted position for a purpose to appear later.

Now referring to FIG. 6, wherein the circuit is illustrated for intermittent wiper operation, the switch arms 101a and 102b in their dotted positions are shown in contact engagement with the bridge terminals 101b and 102c respectively. The circuitry relative to the operation of the wipers 27 remains unchanged for the travel of these switch arms across the full arcuate length of the terminals 101b and 102c, namely, when the wipers 27 are operated on closing of the control switch 32, they will always operate at a slow speed. However as the switch arms 101a and 102a are moved over the terminals 101b and 102c the dwell period of the wipers 27 is varied from a maximum dwell period to a minimum dwell period by the action of the cam 136 on the pin 147.

The cam high side 156, therefore, engages the pin 147 for the travel of the switch arm 101a over the rheostat 101c. As the switch arm 101a travels across the bridge terminal 101b the high side 156 of the cam is moved out of engagement with the pin 147 and a sloped portion 171 of the cam 136 (FIG. 7) engages the pin.

The cam portion 171 progressively falls away from the cam high side 156 at a slope providing for the retraction of the pin 147 from the tubular cross arm 138 at a rate such that when the switch arm 101a has completely traversed the bridge terminal 101b the bleed tube 55 is completely opened so that the dwell period of the wipers 27 is at a minimum corresponding substantially to a continuous operation of the wipers.

It is seen therefore that the rotation of the shaft 123 by the control knob 124 provides for the operation of the wipers 27 and that rotation of the tubular shaft 126 by the control knob 128 determines whether the operation of the wipers 27 is to be continuous or intermittent. Further, regardless of whether the wipers 27 are operated continuously or intermittently, they are moved into their parking positions solely in response to actuation of the control knob 124.

Referring to FIG. 9 the cam units 41 and 42 of the cam unit 29 are shown in their relative positions when the wipers 27 are in parked positions therefor, following the discontinuance of a normal wiper operation, wherein the piston rod 47 of the pneumatic time delay unit 31 is held fully retracted by the closing of the bleed tube 55 by the cam 136. The cam projection 43 is thus held out of engagement with the switch actuator arm 73. Also when the wipers 27 are moved to their parked positions the shoulder 78 of cam 42 is engaged and moved by the crank arm pin 91 to move the cam 42 to its maximum limit of clockwise rotation, as viewed in FIG. 9, whereby the switch actuating arm 73 is out of engagement with the cam projection 76. The switch 32 is thus in its open position illustrated in FIG. 5.

FIG. 10 shows the relative arrangement of the cams 41 and 42 for a normal or continuous operation of the wipers 27. During this operation the retraction of the piston rod 47 resulting from the closing of the bleed tube 55 by the action of the cam 136 retains the cam projection 43 out of engagement with the switch actuator arm 73. The cam 42 is engaged by the crank arm pin 91 and moved to a position wherein the notch 77 is at the lower side of the cam 42. The peripheral length of the notch 77 is less than the arcuate movement of the pin 91 during a normal operation of the wipers 27. As a result, the side walls 78 and 79 of the notch 77 are alternately engaged by the pin 91 during the oscillating movement of the crank arm 23. Although this rotational movement of the cam 42 relative to the cam 41 may result in the engagement of the switch actuator arm 73 by the projection 76 on the cam 42 the resultant closing of the switch 32 has no effect on the normal operation of the wipers 27. In other words, and as shown in FIG. 5, the switch 32, during a normal wiper operation, is cut or shunted from the circuit for the wiper motor 18.

Referring to FIG. 11 the cams 41 and 42 are shown in their relative positions when intermittent wiper operation is initiated. On initial movement of the crank pin 91 in a counterclockwise direction as viewed in FIG. 11, the cams 41 and 42 are rotated in counterclockwise directions to positions wherein the slot wall 79 on the cam 42 is opposite the side wall 92 of the cam projection 44 of the cam 41. At this position the piston rod 47 is retracted by the cam 41, and the switch 32 is closed by the cam 42. On the return movement of the pin 91 in a clockwise direction, the cam 42 is engaged at the side wall 78 of the notch 77 to provide for the movement of the cam 42 out of engagement with the switch actuator 73. When this disengagement takes place the cams 41 and 42 are in their positions shown in FIG. 12 and the wipers 27 are stopped at positions on the vehicle windshield above the parked positions therefor.

With the bleed tube 55 open to the atmosphere the piston rod 47 of the pneumatic time delay unit 31 is progressively extended until the projection 43 on the cam 41 is moved into engagement with the switch actuator 73 to close the switch 32, as shown in dotted lines in FIG. 12. When this engagement takes place the wiper motor 18 is operated and the crank arm pin 91 is moved in a counterclockwise direction as viewed in FIG. 12 into initial engagement with the cam 42 at the side wall 79 of the notch 77 and then into engagement with the side wall 92 of the projection 44 on the cam 41, whereby the piston rod 47 is again retracted, and the cams 41 and 42 are in the positions therefor shown in FIG. 11. The control switch 32 remains closed until the cam 42 is again returned to its position of FIG. 12.

It is to be noted that should the wipers 27 be moved to their parked positions following an intermittent wiping operation that the switch arm 73 of the control switch 32 may be in engagement with the cam projection 43 of the cam 41. On later commencement of wiper operation, therefore, the wipers 27 will operate intermittently. However if continuous wiper operation is desired it is only necessary to actuate the control knob 128 in the manner above described.

Although the invention has been described and illustrated with respect to a preferred embodiment thereof, it is to be understood that it is not to be so limited since changes can be made therein which are within the full intended scope of this invention as defined by the appended claims.

I claim:

1. In a windshield wiper system for producing intermittent dwell wiper operation wherein a dwell period follows a wiper cycling operation comprising:
   (a) a housing,
   (b) a wiper arm shaft rotatably supported in said housing,
   (c) a wiper motor,
   (d) transmission means for transferring the output of said motor to said shaft including a member mounted at one end on said shaft for oscillating movement about the axis thereof,
   (e) a pair of cam members rotatable on said shaft for relative rotational movement,
   (f) means connecting said cam members in a lost motion relation with said oscillating member,
   (g) switch means connected in the circuit of said motor and mounted on said housing including an actuator selectively engageable by said cam members,
   (h) a pneumatic time delay means mounted on said housing and connected to one of said cam members, and
   (i) a manual control means for closing the circuit of said motor through said switch means and for variably venting said pneumatic time delay means,
   (j) said actuator maintained by the other of said cam members in a position to open said switch means, when the time delay means is in operation, and moved by said one cam member to a position to close said switch means as the time delay means approaches the end of its operating period, with said two cam members coacting with said oscillating member to hold the actuator in a switch closing position to provide for one complete oscillation of said shaft concurrently with the re-setting of said time delay means for a time delay operation.

2. A windshield wiper system for producing intermittent dwell wiper operation wherein a dwell period follows a wiper cycling operation comprising:
   (a) a housing,
   (b) a wiper arm shaft rotatably supported in said housing for oscillating movement,
   (c) a wiper motor,
   (d) a transmission means for transferring the output of said motor to said wiper arm shaft including a rocker arm mounted at one end on said shaft,
   (e) a pneumatic time delay means mounted on said housing including a reciprocally movable working member,
   (f) a pair of cam members rotatable on said wiper arm shaft for relative rotational movement,
   (g) means connecting said pair of cam members in a lost motion relation with said rocker arm,
   (h) means connecting said working member with one of said cam members, and
   (i) switch means connected in the circuit of said wiper motor and mounted on said housing including an actuator selectively engageable with said cam members to open and close said switch means,
   (j) said actuator being out of engagement with said cam members, when said working member is moving in one direction for a predetermined duration of time to provide a dwell period for said wiper arm shaft, and being engageable by said cam members at the end of said dwell period to operate said wiper motor for a time period providing for a complete oscillating cycle of said wiper arm shaft concurrently with the movement of said working member in an opposite direction and the movement of said cam members out of engagement with said actuator.

3. In a windshield wiper system for producing intermittent dwell wiper operation wherein a dwell period follows a wiper cycling operation comprising:
   (a) a housing,
   (b) a wiper pivot shaft supported in said housing for oscillating movement,
   (c) a wiper motor,
   (d) a rocker arm mounted on said shaft in a driven relation with said wiper motor,
   (e) a pair of cam members rotatably mounted on said pivot shaft,
   (f) lost motion means connecting said cam members in a driven relation with said rocker arm for relative rotational movement,
   (g) a time delay means on said housing including a reciprocating working member connected to one of said cam members, said working member being biased in one direction to rotate said one cam member and movable in an opposite direction by said one cam member, and (h) a switch means connected in the circuit of said wiper motor and mounted on the housing including an actuator selectively engageable by said cam members to open and close said wiper motor circuit, (i) said switch actuator being out of engagement with said cam members for a predetermined time period during which said working member is moved in said one direction, and being successively engaged by said cam members at the end of said time period to operate said wiper motor to provide for a complete oscillating cycle of said pivot shaft concurrently with the movement of said operating member by said one cam member in said opposite direction and the movement of said cam members out of engagement with said switch actuator.

4. In a windshield wiper system for producing intermittent dwell wiper operation wherein a dwell period follows a wiper cycling operation comprising:

(a) a housing supporting a wiper pivot shaft for oscillating movement, (b) a wiper motor, (c) transmission means for transferring the output of said motor to said pivot shaft, (d) a time delay means on said housing including a working member spring actuated in one direction, (e) a switch means on said housing connected in the circuit of said wiper motor including an actuating member, (f) combination timing and actuating means rotatably mounted on said pivot shaft and connected to the working member of said time delay means, said combination means selectively engageable with said switch actuating member to open and close said wiper motor circuit, and (g) lost motion means connecting said combination means with said transmission means, (h) said combination means being out of engagement with said switch actuating member for a predetermined time period during which the working member of the time delay means is being moved in said one direction to provide for a dwell period of said wiper pivot shaft and engageable with the switch actuating member at the end of said dwell period to provide for the operation of said wiper motor to oscillate the wiper pivot shaft through a complete oscillation cycle to rotate said combination means to move said working member in an opposite direction and said combination means out of engagement with the switch actuating member.

5. The wiper system according to claim 4 wherein:

(a) said transmission means includes a drive member mounted at one end on said pivot shaft for oscillating said shaft in response to operation of said wiper motor, (b) said combination means includes a pair of cam members mounted for relative rotation on the pivot shaft, with a first of said cam members connected to the spring actuated working member of the time delay means and each of said cam members having portions engageable in a timed relation with said switch actuating member, and (c) lost motion means connecting said drive member with said pair of cams to rotate said cam members in one direction, during the wiper shaft oscillating cycle, to move the one cam member out of engagement with said switch actuating member concurrently with the movement of the second cam member into engagement with the switch actuating member and the movement of said working member in an opposite direction therefor, and to rotate the second cam member in a reversed direction out of engagement with the switch actuating member to initiate the starting time of said dwell period.

6. The windshield wiper system according to claim 4 including:

(a) a manually controlled switch unit for the wiper motor circuit operable to a first position to bypass said switch means to provide a continuous operation of said wiper motor, to a second position wherein said switch means is responsive to the rotation of the combination means to intermittently energize the wiper motor, and to a third position for parking said wiper pivot shaft.

7. The windshield wiper system according to claim 6 wherein:

(a) said manually controlled switch unit includes a means for varying the time duration of the dwell period provided by said time delay times, when the switch unit is in the second position therefor.

References Cited

UNITED STATES PATENTS

| | | | |
|---|---|---|---|
| 1,588,399 | 6/1926 | Anderson | 15—250.12 XR |
| 3,091,792 | 6/1963 | Gute | 15—250.12 XR |
| 3,148,399 | 9/1964 | Ziegler | 15—250.02 |

WALTER A. SCHEEL, *Primary Examiner.*

ROBERT I. SMITH, *Assistant Examiner.*